United States Patent [19]

Endo

[11] Patent Number: 5,408,239

[45] Date of Patent: Apr. 18, 1995

[54] METHOD FOR SETTING SEARCH BAND WIDTHS OF A GPS RECEIVER

[75] Inventor: Isao Endo, Kawagoe, Japan

[73] Assignee: Pioneer Electronic Corporation, Tokyo, Japan

[21] Appl. No.: 26,068

[22] Filed: Mar. 4, 1993

[30] Foreign Application Priority Data

| Mar. 16, 1992 | [JP] | Japan | 4-058001 |
| Mar. 18, 1992 | [JP] | Japan | 4-061996 |
| Mar. 27, 1992 | [JP] | Japan | 4-071341 |

[51] Int. Cl.$^6$ .................... H04B 7/185; G01S 13/00
[52] U.S. Cl. ..................... 342/352; 342/100; 342/199
[58] Field of Search .......... 342/356, 352, 98, 99, 342/100, 199, 357

[56] References Cited

U.S. PATENT DOCUMENTS

| 3,893,115 | 7/1975 | Linder | 342/99 |
| 5,036,329 | 7/1991 | Ando | 342/357 |
| 5,059,969 | 10/1991 | Sakaguchi et al. | 342/352 |
| 5,177,490 | 1/1993 | Ando et al. | 342/357 |
| 5,185,761 | 2/1993 | Kawasaki | 342/352 |

Primary Examiner—Gregory C. Issing
Attorney, Agent, or Firm—Foley & Lardner

[57] ABSTRACT

In a GPS receiver which searches for a satellite radio wave over a predetermined search bandwidth while setting a search center frequency $f_s$ to a start point, an offset value of $\Delta f_{osc}$ of an oscillator calculated last when a power source of the receiver is turned off upon completion of the position measurement is stored as a backup value into a memory. When the power source of the receiver is turned on at the next position measurement, the backup offset value $\Delta f_{osc}$ is read out and an initial search bandwidth $W_0$ at the start of the position measurement is set in accordance with the magnitude of the offset value. According to another feature, when the offset value of the oscillator calculated during the position measurement exceeds a predetermined reference value, a time point of the calculation is backed up into a memory. If a predetermined reference time has not elapsed from the backup time point, at the time point when the power source is turned on for the next position measurement, an initial search bandwidth at the start of the position measurement is set to a wide band.

21 Claims, 11 Drawing Sheets

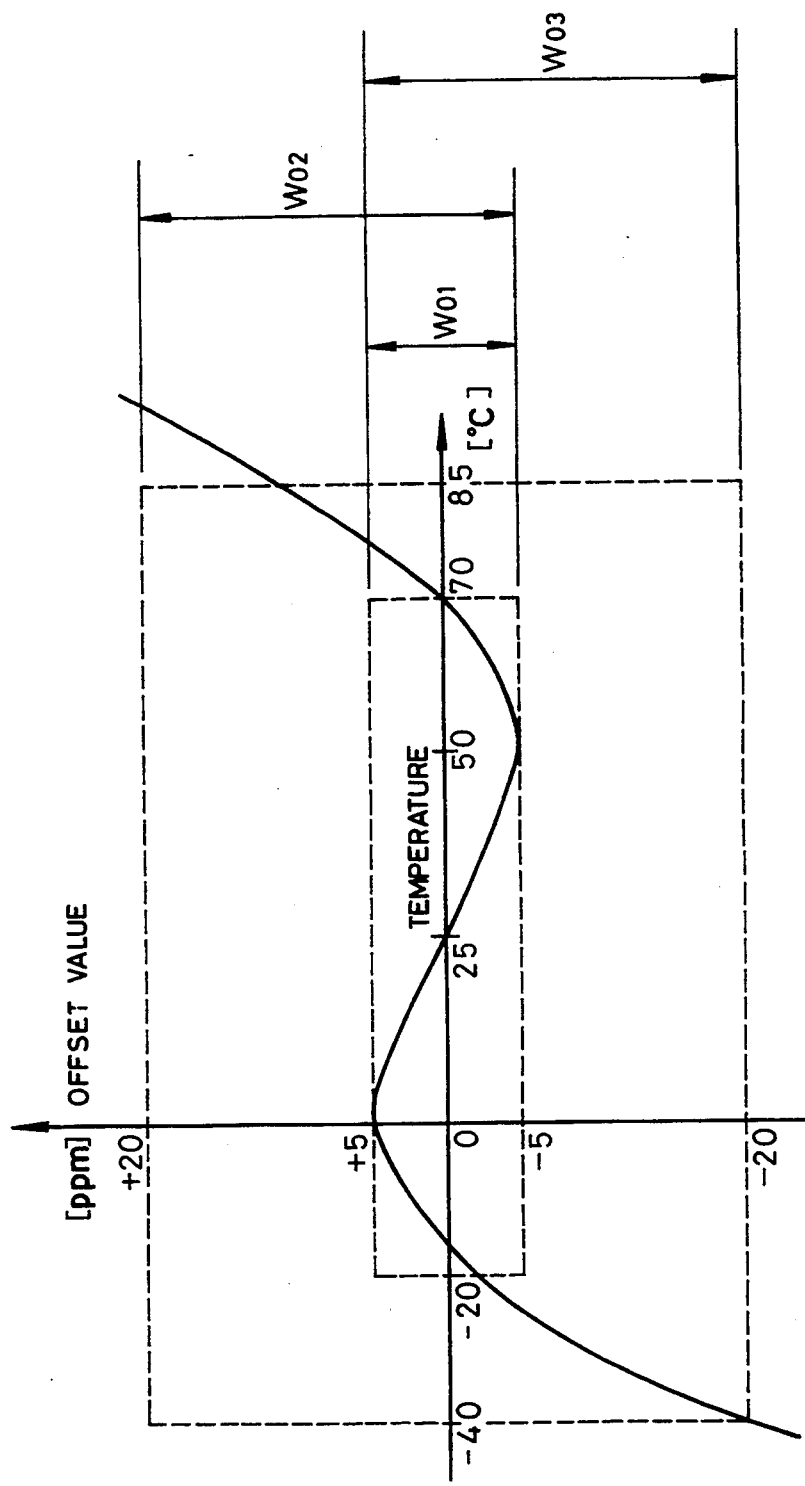

METHOD FOR SETTING SEARCH BAND WIDTHS OF A GPS RECEIVER

BACKGROUND OF THE INVENTION

1. Field of the Invention

The present invention relates to a method for setting search band widths in a GPS receiver.

2. Description of Background Information

A Position measuring system using artificial satellites is known as Global positioning System (GPS). The system employs six orbits set around the earth at an altitude of about 20200 km. Into each of the orbits, a plurality of satellites are put up so that GPS signals including navigation data for the position measurement are transmitted from the satellites toward the earth by a spread spectrum method. The radio waves of three or four satellites which are necessary for the position measurement are received by a GPS receiver on the ground (or on the sea or in the air), thereby enabling the calculation of necessary position information such as latitude, longitude, altitude of the reception point in a real-time manner by using the navigation data included in the GPS signal from each satellite.

The GPS signal which is released for non-military use is called C/A code, and is transmitted at a frequency of 1575.42 MHz. Therefore, to capture the satellite signal, in principle, it is sufficient to wait for the reception of the radio wave at 1575.42 MHz in a standby mode. However, since the GPS satellite is not a geostationary satellite, fluctuation of the received frequency will occur due to a Doppler effect. Furthermore, the oscillating frequency of an oscillator of the GPS receiver also fluctuates due to an offset of such an oscillator.

To capture the satellite signal in practice, accordingly, a search center frequency of the satellite radio wave is set by a frequency shift corresponding to a deviation amount of the received frequency due to the Doppler effect (hereinafter, referred to as "Doppler frequency deviation") and an offset amount of the oscillator. Furthermore, an appropriate search bandwidth is set, so that the satellite signal is searched for while shifting the search frequency in the high and low frequency directions within the search bandwidth, with a search start point being set to the search center frequency. Thus the capture of the satellite signal is completed at a point in time when the oscillator is locked to the satellite radio wave. By repeating the above capturing operations, signals from the satellites of the number necessary for the position measurement are captured.

In the operation of capturing the satellite signal, the narrower the search bandwidth the shorter the capturing time of the satellite signal. Also, the smaller the offset value of the oscillator, the narrower the search bandwidth. Therefore, in order to set the search bandwidth as narrow as possible, it is desirable to minimize an error of the offset value of the oscillator of the GPS receiver.

In conventional GPS receivers, accordingly, a crystal oscillator with a temperature compensation device of an extremely high accuracy (hereinafter, such an oscillator is referred to as "TCXO") is used as an oscillator. Furthermore, those receivers are designed to store into a memory the offset value of the oscillator calculated last when the power source of the receiver is turned off upon completion of the position measurement, as a backup value. The backup value is used as an initial offset value of the oscillator at the beginning of the next position measurement.

The TCXO exhibits, by the compensation of temperature characteristics of the quartz resonator by an electrical circuit, an extremely high accuracy of about ±2 to ±5 ppm (parts per million) (±3 kHz to ±8 kHz in the frequency) in a wide temperature range from −40° C. to +85° C. On the other hand, the accuracy of oscillators used in an ordinary communicating apparatus lies within a range of about ±50 to ±100 ppm and, preferably, about ±20 ppm.

In conventional GPS receivers, since the highly accurate TCXO is used, there has been no need to consider the change in offset value of the oscillator due to a temperature change in the receiver for a period of time when the power source of the receiver is OFF. The offset value backed up in the memory is directly used as an initial offset value at the start of the next position measurement. In the event that the data stored in the memory is extinguished or the backup data is made invalid due to an error of the memory or the like, the search range is determined as wide as the whole fluctuation range of the offset value of the TCXO.

If an oscillator of a low accuracy is used, on the other hand, a change in offset value due to a temperature change is large and the offset value backed up in the memory cannot directly be used as an offset value of the oscillator at the start of the next position measurement. Therefore, when an oscillator of a low accuracy is used, it is necessary to search for the satellite radio wave in a wide band over a whole range of the offset change of the oscillator. A problem arises in that a long time is required to capture the satellite signal because of the necessity of the search through such a wide band. Such a problem also occurs even if a backup value of the offset value is used.

OBJECTS AND SUMMARY OF THE INVENTION

The present invention is made in consideration of the above circumstances and it is an object of the invention to provide a method of setting a search bandwidth in a GPS receiver, in which a capturing time of a satellite signal can be reduced, even if an oscillator of a relatively low accuracy is used.

To accomplish the above object, according to method of the first feature of the present invention, in a GPS receiver which searches for a satellite radio wave over a predetermined search bandwidth while setting a search start point at a search center frequency, an offset value of an oscillator calculated last when a power source of the receiver is turned off upon completion of a position measurement is stored as a backup value into a memory. The offset value thus backed up is read out when the power source of the receiver is turned on at the time of the next position measurement, and an initial search bandwidth at the start of the position measurement is set in accordance with the magnitude of the offset value.

To accomplish the above object, according to a method of the second feature of the present invention, in a GPS receiver which searches for a satellite radio wave over a predetermined search bandwidth while setting a search start point at a search center frequency, when an offset value of an oscillator calculated during the position measurement exceeds a predetermined reference value, the calculated time is stored as a backup value into a memory, and only if a predetermined reference time has not elapsed from the backup calculation time at a time point of the turn-on of the power source for the next position measurement, an initial search bandwidth at the start of the position measurement is set to a wide band.

To accomplish the above object, according to a method of the third feature of the present invention, in a GPS receiver which searches for a satellite radio wave over a predetermined search bandwidth while setting a search start point at a search center frequency, an offset value of an oscillator calculated during the position measurement is stored as a backup value into a memory. In the operation of setting an initial search bandwidth at the start of the next position measurement, if the backup offset value exceeds a positive side reference value, an upper search bandwidth for a reference received frequency is set at the maximum range of an offset change of the oscillator and a lower search bandwidth is set to be smaller than the maximum range of the offset change. If the backup offset value exceeds a negative side reference value, the lower search bandwidth for the reference received frequency is set to the maximum range of the offset change of the oscillator and the upper search bandwidth is set to be smaller than the maximum range of the offset change.

BRIEF DESCRIPTION OF THE DRAWING

FIG. 11 is a diagram showing an example of temperature characteristics of the oscillator.

DETAILED DESCRIPTION OF THE PREFERRED EMBODIMENTS

Prior to explaining embodiments in detail, the principle of a search bandwidth setting method according to the first feature of the present invention will be first explained.

Figure 1:
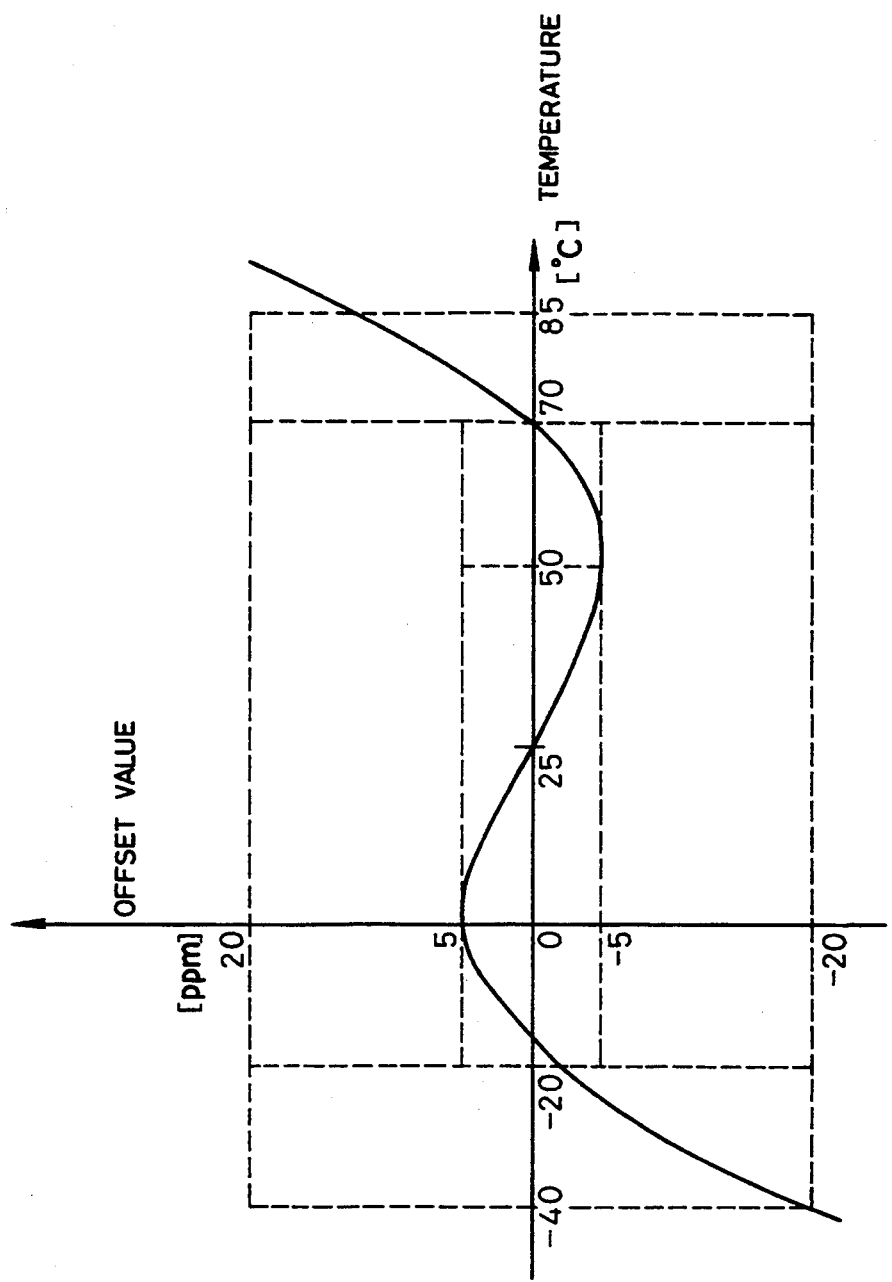
FIG. 1 is a diagram showing an example of temperature characteristics of an oscillator.

FIG. 1 shows an example of temperature characteristics of an oscillator which realizes an offset value of ±20 ppm in a temperature range from −40° C. to +85° C. As will be readily understood from FIG. 1, a change in offset value is large at positions near the right and left ends of the temperature range. In other words, it will be understood that when (the absolute value of) the offset value is small, the temperature change of the offset value is also small and, when (the absolute value of) the offset value is large, the temperature change of the offset value is also large.

When (the absolute value of) the offset value backed up in the memory is small, since it is presumed that a change in offset value for the temperature change is also small, it is sufficient to set an initial search bandwidth to a narrow width. When (the absolute value of) the offset value backed up in the memory is large, it is presumed that a change in offset value for the temperature change is also large. It is, therefore, sufficient to set an initial search bandwidth to a wide width. By searching for a satellite radio wave in accordance with the backup value of the offset value as mentioned above, even in case of using an oscillator of a low accuracy, a situation such that the wide frequency range must be always searched as in the conventional method can be avoided, so that a capturing time of the satellite signal can be reduced.

Figure 2:
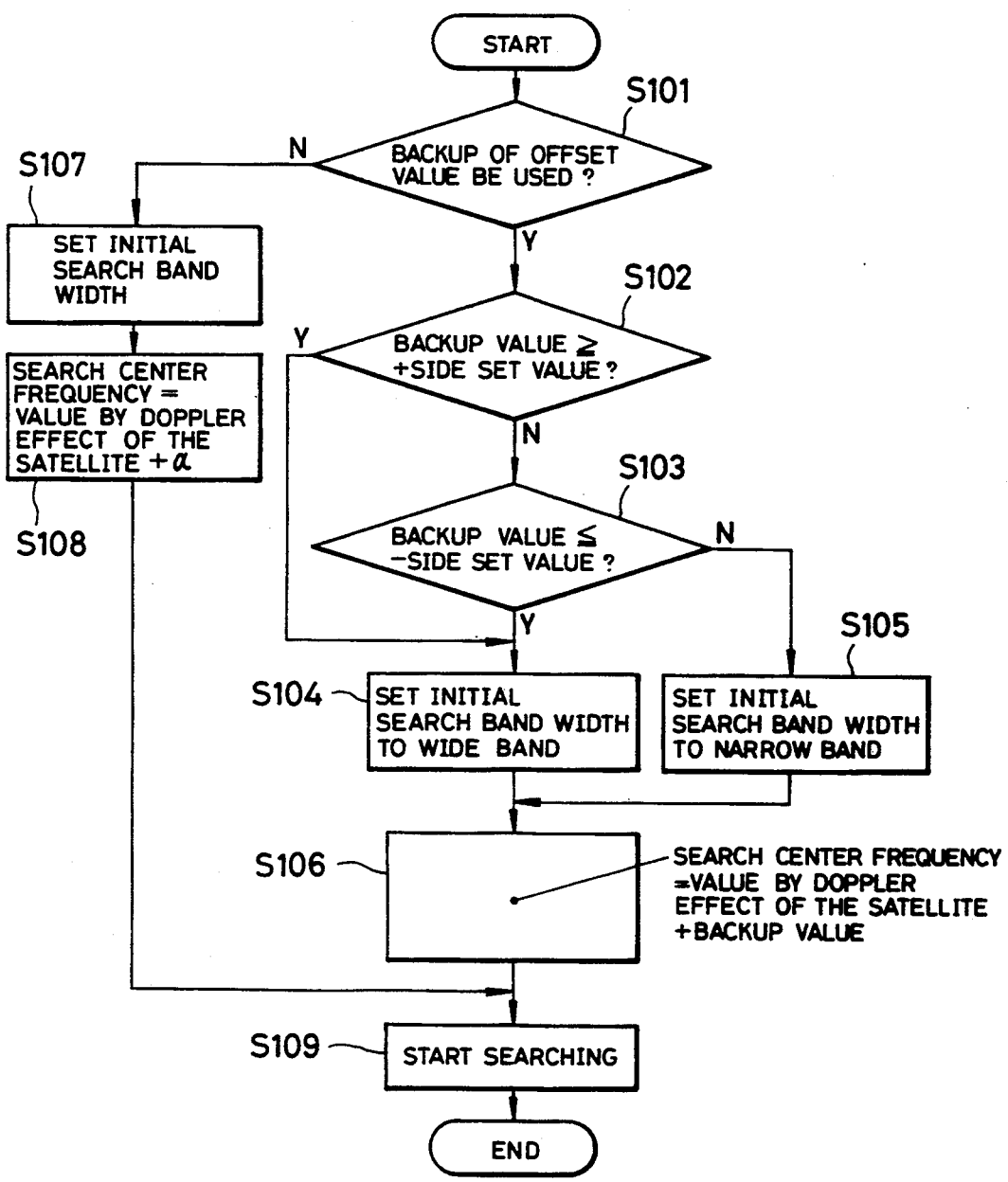
FIG. 2 is an operation flowchart according to an embodiment of a method of the present invention.

FIG. 2 is an operation flowchart of an embodiment according to the first feature of the present invention.

Figure 3:
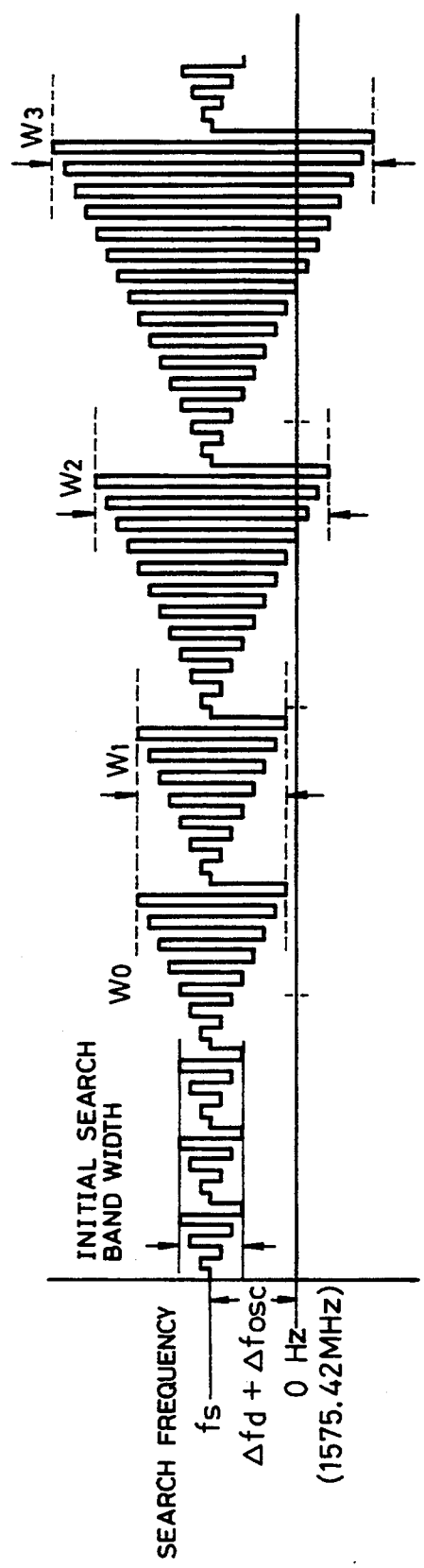
FIG. 3 is a diagram for explaining a switching operation of a search bandwidth in the embodiment in the case where a back-up offset value is small and where the initial bandwidth is set to a narrow band in the embodiment of FIG. 5.

FIG. 3 is a diagram for explaining the switching operation of a search bandwidth in the case where the backup offset value is small in the above embodiment.

Figure 4:
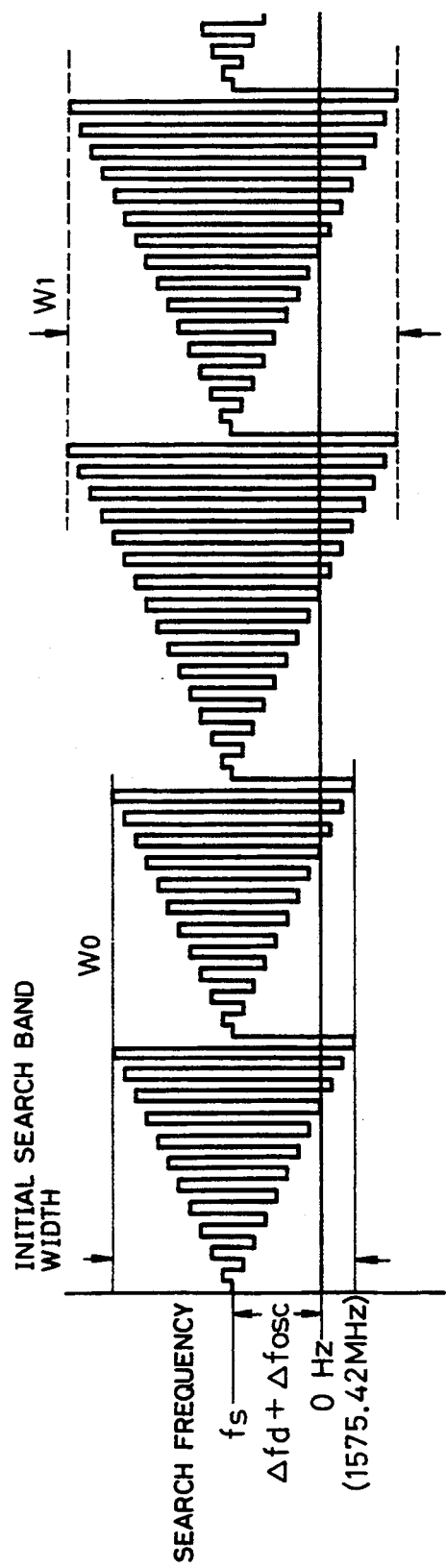
FIG. 4 is a diagram for explaining the switching operation of a search bandwidth in the embodiment in the case where the back-up offset value is large.

FIG. 4 is a diagram for explaining the switching operation of a search bandwidth in the case where the backup offset value is large in the above embodiment.

According to the embodiment, in accordance with the result of judgment regarding whether (the absolute value of) the offset value of the oscillator which has been backed up in the memory is larger or smaller than a predetermined reference value at the end of the preceding position measurement, an initial search bandwidth $W_0$ at the start of the next position measurement is switched to either one of the wide and narrow bands as shown in FIGS. 3 and 4. The processing operation in this instance will now be described in detail hereinafter.

In the case of the present invention, reference values on the positive and negative sides to judge the magnitude of the offset value which has previously been backed up in the memory are set. By way of the temperature characteristics of FIG. 1 as an example, the operation will now be described. In a range from −20° C. to +70° C. which is considered to cover the ordinary use temperature range, the offset value is equal to or less than ±5 ppm. For instance, therefore, +5 ppm is set as a positive side reference value and −5 ppm is set as a negative side reference value.

When the power source of the GPS receiver is now turned on to perform the position measurement, the receiver reads out an offset value (hereinafter, abbreviated to a backup value) $\Delta f_{osc}$ of the oscillator which has been backed up at the end of the preceding position measurement from the memory. A check is made to see if the backup value is used as an initial offset value of the oscillator at the present position measurement or not (step S101 in FIG. 2). In the following description, for simplicity of explanation, it is assumed that a unit of the backup value $\Delta f_{osc}$ is not displayed by a unified value but is set to ppm or [Hz] according to circumstances. It is needless to say that the processing unit should be unified in the actual processes.

In the case where the read-out backup value $\Delta f_{osc}$ is not used as an initial offset value for the present position measurement, a predetermined initial search bandwidth, for example, the maximum change range of the offset value of the oscillator is set as an initial search bandwidth (step S107). A search center frequency $f_s$ is set by using a Doppler frequency deviation $\Delta f_d$ of the satellite which has been calculated from orbit data and a desired offset value $\alpha$ which has been prepared (step S108). After that, the searching operation of the satellite radio wave is started (step S109). Although the desired offset value $\alpha$ can be set to a fixed value, it is desirable to change the offset value $\alpha$ in accordance with the use environment of the receiver.

In case of using the backup value as an initial offset value for the present position measurement, a check is made to see if the read-out backup value $\Delta f_{osc}$ is larger than the predetermined positive side reference value (for example, +5 ppm) or not (step S102). When it is detected that the backup value $\Delta f_{osc}$ is smaller than the predetermined positive side reference value, a check is further made to see if the backup value $\Delta f_{osc}$ is smaller than negative side reference value (for instance, $-5$ ppm) or not (step S103).

In step S103, when it is detected that the backup value $\Delta f_{osc}$ is larger than the negative side reference value ($-5$ ppm), it will be understood that the backup value $\Delta f_{osc}$ lies within a narrow range of $\pm 5$ ppm (in a temperature range from $-20°$ C. to $70°$ C.) in the temperature characteristics of FIG. 1. When the backup value lies within a predetermined range as mentioned above, there is no need to set the initial search bandwidth $W_0$ to a fairly wide width.

In step S105, accordingly, the initial search bandwidth $W_0$ is set to a narrow width as shown in FIG. 3. After that, in step S106, the search center frequency $f_s$ is set on the basis of the Doppler frequency deviation $\Delta f_d$ of the satellite calculated from the orbit data and the backup value $\Delta f_{osc}$ in step S106. After that, the searching operation is started (step S109).

In the case where the target satellite signal cannot be captured even by repeating the searching operation a predetermined number of times (three times in FIG. 3) within the set initial search bandwidth $W_0$, the searching operation is successively executed while gradually widening the search bandwidth like $W_1$ to $W_4$.

On the other hand, when it is detected in step S103 that the backup value $\Delta f_{osc}$ is smaller than the negative side reference value ($-5$ ppm), it will be understood that the backup value $\Delta f_{osc}$ lies within a range of the large absolute value ($-20°$ C. or less in a temperature range) on the lower side than $-5$ ppm in the temperature characteristics of FIG. 1.

When it is detected in step S102 that the backup value $\Delta f_{osc}$ is larger than the positive side reference value (+5 ppm), it will be understood that the backup value $\Delta f_{osc}$ lies within a range of the large absolute value (+70° C. or higher in a temperature range) on the upper side than +5 ppm in the temperature characteristics of FIG. 1.

As mentioned above, when the absolute value of the backup value is large, the fluctuation of the frequency is also large and it is also necessary to set the initial search bandwidth $W_0$ to a large width in accordance with such a large frequency fluctuation. In step S104, therefore, the initial search bandwidth $W_0$ is set to a wide band as shown in an example of FIG. 4. After that, in step S106, the search center frequency $f_s$ is set from the Doppler frequency deviation $\Delta f_d$ of the satellite calculated from the orbit data and the backup value $\Delta f_{osc}$ in step S106. After that, the searching operation is started (step S109).

By switching the initial search bandwidth $W_0$ in accordance with the magnitude of the offset value which has been backed up in the memory as mentioned above, even when an oscillator of a low accuracy is used, the initial search bandwidth can be set to a narrow width in an ordinary use temperature range. The capturing time of the satellite radio wave can be reduced by a time corresponding to such a narrow initial search bandwidth.

Although the above embodiment has been described with respect to the case of switching the initial search bandwidth $W_0$ to either one of the two bandwidths shown in FIGS. 3 and 4, the number of switching values of the initial search bandwidth $W_0$ can be also set to an arbitrary number. The initial search bandwidth $W_0$ can be also continuously switched in proportion to the magnitude of the backup value.

As will be readily understood from the above description, according to the method of the present invention, the offset value of the oscillator which has been calculated last when the power source of the receiver is turned off upon completion of the position measurement is stored as a backup value into the memory. When the power source of the receiver is subsequently turned on at the time of the next position measurement, the backup offset value is read out and the initial search bandwidth at the start of the position measurement is set in accordance with the magnitude of the offset value. Even in case of using an oscillator of a low accuracy, therefore, the capturing time of the satellite can be reduced.

A method of setting a search bandwidth according to the second feature of the present invention will now be described.

When the offset value backed up in the memory is not used as an initial offset value at the start of the position measurement, the whole fluctuation range of the backup offset value is used as a search bandwidth in principle. Even if the backup value is used as an initial offset value, it is necessary to set the search bandwidth in consideration of the accuracy of the oscillator. In this case, when an oscillator of a low accuracy is used in the receiver, the search band becomes too wide, so that it is necessary to limit the search bandwidth by some method.

As will be obviously understood from FIG. 1, it will be understood that (the absolute value of) the offset value has a large value at only both edges (near +85° C. and $-40°$ C.) of the operation temperature range.

The temperature of the receiver is hardly set to such a high or low temperature in an ordinary use state. It is considered that the placement of the receiver in such a high or low temperature is concentrated to particular cases in terms of the season or district. That is, in locations and times at which such a situation does not occur generally, it can be regarded that such situation never exists. On the other hand, when such a state once occurs, it is presumed that such a state continues for a while.

According to the second feature of the invention, where it is necessary to search a wide band, as in case of using an oscillator of a low accuracy, the search operation is not of the type to always search the whole range of the temperature change of the offset value, as in the conventional method. Instead, only where it is presumed that the oscillator has a large offset value at that point in time, is a wide band searched.

According to the method of the second feature of the present invention, at a time point when the power source is turned on for the next position measurement, if a predetermined reference time has not elapsed, as measured for a period of time from a point in time at which offset value backed up in the memory has exceeded a predetermined value to a point in time when the power source is turned on at the next position measurement, it is assumed that there is a large possibility that the offset value of the oscillator subsequently has a large value exceeding the reference value. In this case, the initial search bandwidth at the start of the position measurement is set to a wide width. Otherwise, the search band is set to a narrow width.

With the above method, even using oscillator of a low accuracy, the initial search bandwidth can be set to a narrow width in a situation where the oscillator is continuously used in an ordinary temperature range, so that the capturing time of the satellite can be reduced in correspondence to such a narrow bandwidth. Even in a situation where the offset value of the oscillator is large, the initial search bandwidth can be properly set and the capturing time can be reduced due to setting such a proper bandwidth.

An embodiment of the method according to the second feature of the present invention will now be described hereinafter with reference to the drawings.

Figure 5:
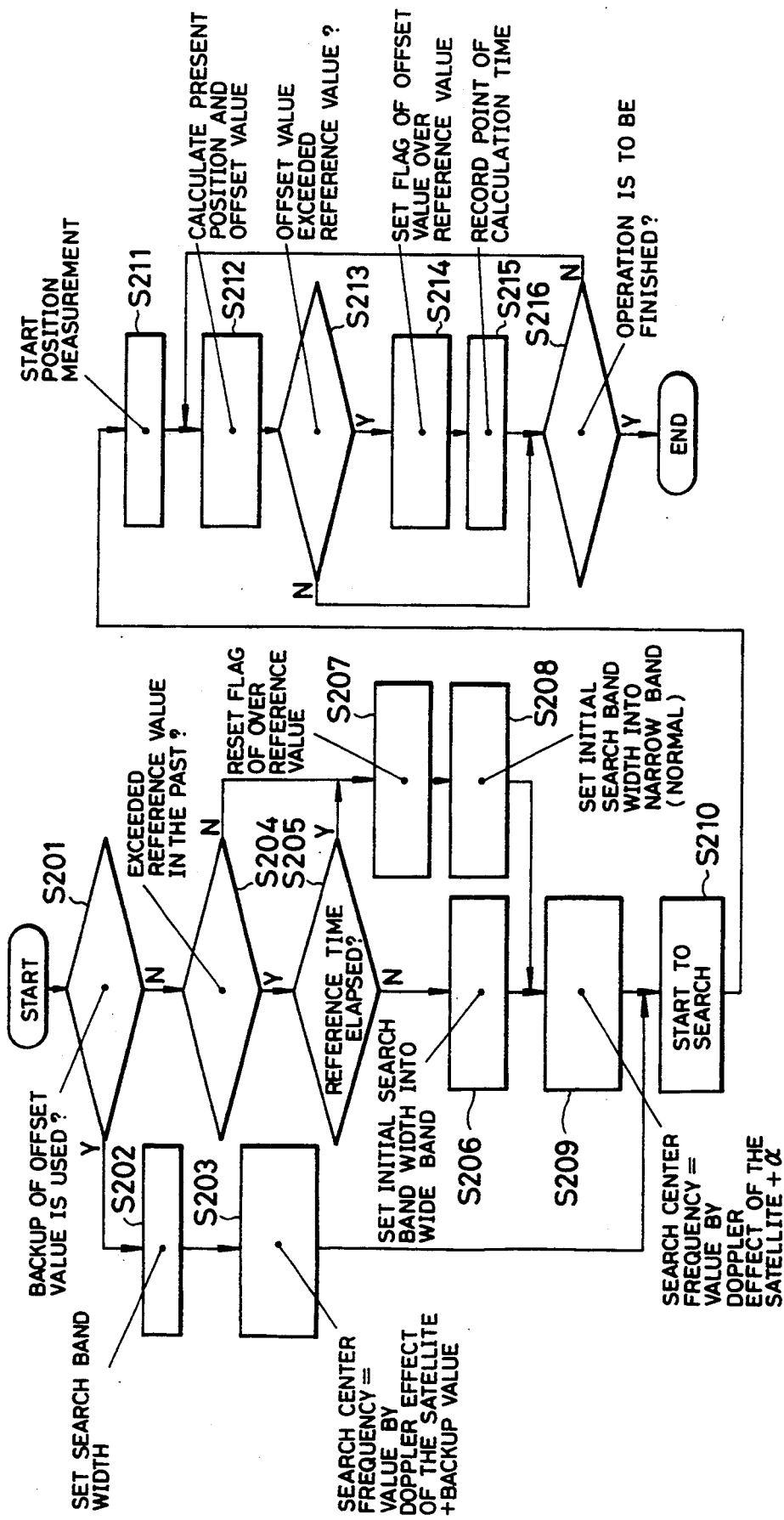
FIG. 5 is an operation flowchart according to another embodiment of a method of the invention.
Figure 7:
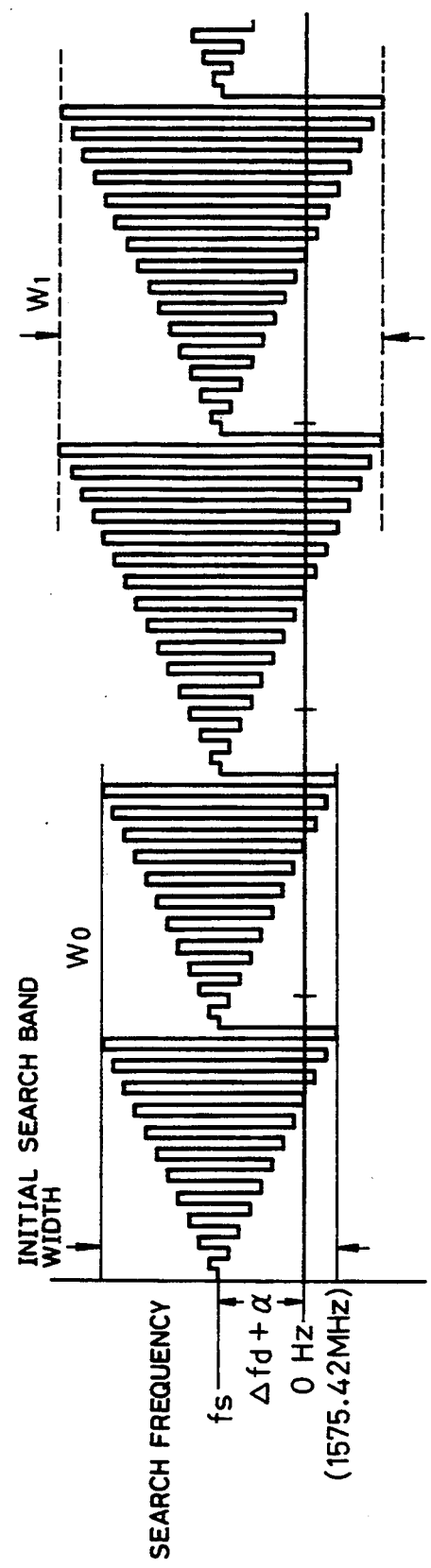
FIG. 7 is a diagram for explaining the switching operation of a search bandwidth in the case where the initial search bandwidth is set to a wide band in the above embodiment.

FIG. 5 is an operation flowchart of this method of the invention. FIG. 3 is a diagram explaining the switching operation of a search bandwidth in the case where the initial search bandwidth is set to a narrow band in the above embodiment. FIG. 7 is a diagram explaining the switching operation of the search bandwidth in the case where the initial search bandwidth is set to a wide band in the above embodiment.

In case of the second feature of the invention, a reference value to judge whether or not the offset value exceeds a value in the ordinary use temperature range during the calculation of the position measurement, and a reference time to discriminate the elapsed time from the time point at which the offset value, exceeds the reference value are first set. For instance, the case of the temperature characteristics of FIG. 1 will now be described as an example. The offset value lies within a range of ±5 ppm in a range from −20° C. to +70° C. This temperature range is considered to almost cover the ordinary use temperature range, so that ±5 ppm are set as reference values. The reference time is set to be, for example, one week or the like depending upon the use environment.

When the power source of the GPS receiver is turned on to perform the position measurement, the receiver judges whether or not the offset value (hereinafter, abbreviated to a backup value) $\Delta f_{osc}$ of the oscillator, which has been backed up in the memory at the end of the preceding position measurement, is used as an initial offset value of the oscillator at the present position measurement (step S201 in FIG. 5).

When the backup value $\Delta f_{osc}$ is used as an initial offset value, the processing routine advances to step S202 and a predetermined initial search bandwidth is set (step S202). The search center frequency $f_s$ is set on the basis of the Doppler frequency deviation $\Delta f_d$ of the satellite, as calculated from the orbit data, and the backup value $\Delta f_{osc}$ (step S203). After that, the searching operation is started (step S210).

When the backup value $\Delta f_{osc}$ is not used as an initial offset value, the processing routine advances to step S204. In step 204, a check is made to see if the offset value calculated in the past exceeds the reference value (for example, ±5 ppm). If the answer is YES, step S205 follows and a check is made to see if the elapsed time from the time point at which the offset value exceeding the reference value was calculated exceeds the predetermined reference time (e.g., one week).

If it is detected in step S205 that the elapsed time does not exceed the reference time, the present use environment of the receiver is considered to be hardly changed from that at the preceding position measurement and it is presumed that the change in offset value of the oscillator is large in a manner similar to that at the end of the preceding position measurement. The processing routine, accordingly, advances to step S206 and the initial search bandwidth $W_0$ is set to a wide band as shown in FIG. 7.

In step S209, the search center frequency $f_s$ is set by using the Doppler frequency deviation $\Delta f_d$ of the satellite calculated from the orbit data and the predetermined offset value $\alpha$ which has been prepared. After that, the searching operation is started (step S210).

When it is detected in step S204 that the offset value calculated in the past doesn't exceed the reference value (for example, ±5 ppm), this means that the use environment of the receiver lies within the range of ±5 ppm in the temperature characteristics of FIG. 1. Since it is, therefore, presumed that the change range of the offset value at that time point is small, the processing routine advances to step S207.

Similarly, when it is detected in step S205 that the elapsed time exceeds the reference time (for example, one week), it is presumed that the ambient use environment has been changed from that at the preceding position measurement, so that the processing routine advances to step S207.

A flag indicating the occurrence of an offset over reference value is reset in step S207. After that, step S208 follows and the initial search bandwidth $W_0$ is set to a narrow band as shown in FIG. 3. In step S208, the search center frequency $f_s$ is set by using the Doppler frequency deviation $\Delta f_d$ of the satellite calculated from the orbit data and the fixed offset value $\alpha$ which has been prepared. After that, the searching operation is started (step S210).

In the case where the satellite signal cannot be captured even by repeating the searching operations for a predetermined time in the set initial search band width $W_0$ or a predetermined number of times, as shown in FIGS. 3 and 7, the searching operation is repetitively executed until the satellite signal is captured while gradually widening the search bandwidth, for example from $W_1$ to $W_4$.

When a desired number of satellite signals are captured after the completion of the searching operation, position measurement is started on the basis of the navigation data, which is sent from the satellites (step S211). The present position and the offset value are calculated (step S212). A check is made to see if the calculated offset value exceeds a reference value (step S213). If the answer is YES, the flag indicative of indicating occurrence of an offset over reference value is set (step S214). The time at which this offset value was calculated is stored as a backup into the memory (step S215). The processes in steps S212 to S215 are repeated until the measuring operation is finished (step S216).

Figure 6:
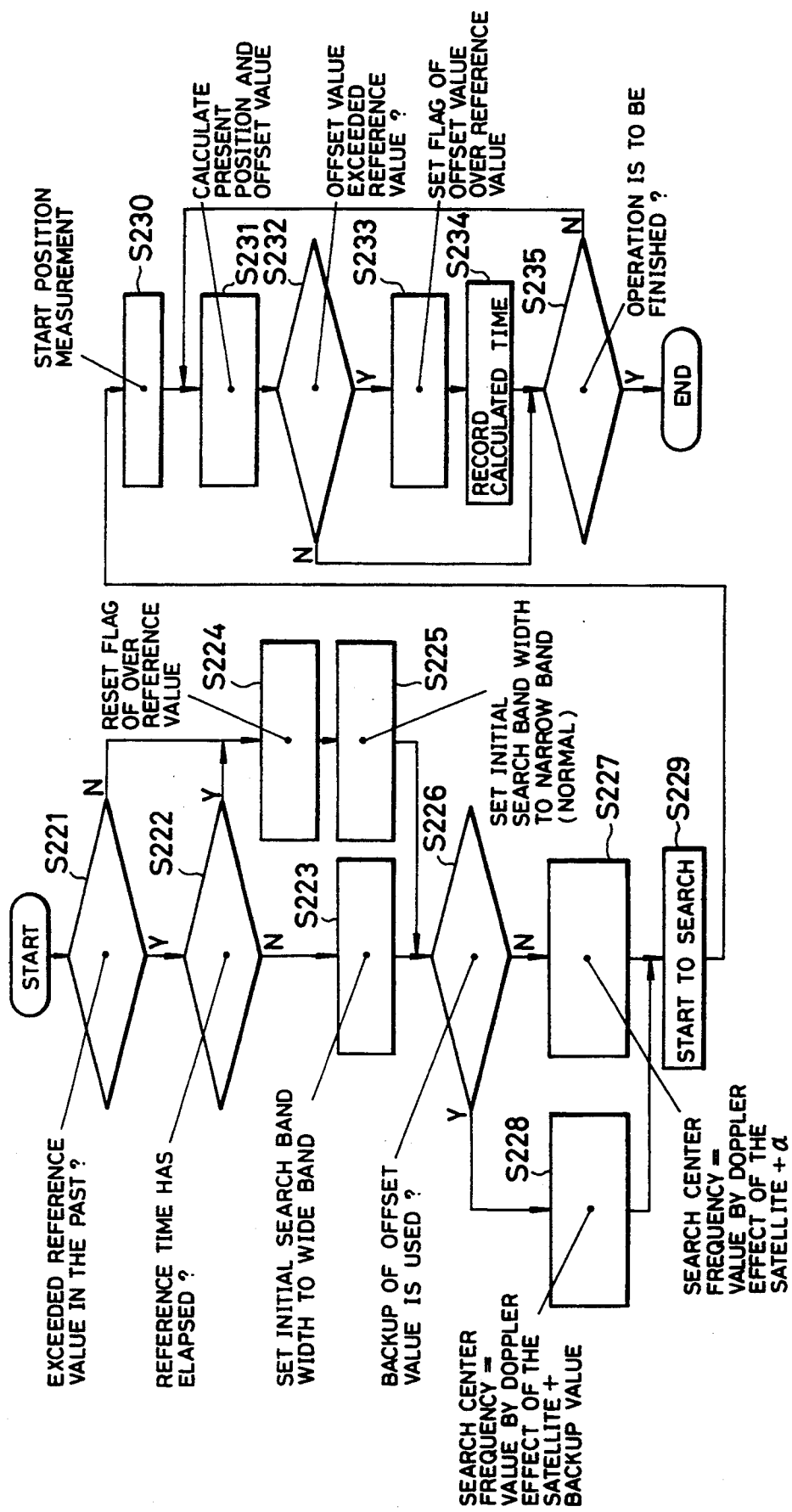
FIG. 6 is an operation flowchart according to still another embodiment of a method of the invention.

According to the embodiment of FIG. 5 mentioned above, the method of the present invention is applied in the case where the backup value $\Delta f_{osc}$ is not used and the initial search bandwidth is set to either one of the wide band and the narrow band. The method of the present invention can be also obviously applied when using the backup value $\Delta f_{osc}$. FIG. 6 shows an operation flowchart of the case of using the backup value. In the case of FIG. 5, when the backup value is not used, the processing routine advances from step S201 to step S202 and the predetermined initial search bandwidth is set. In the case of FIG. 6, however, in instances, the initial search bandwidth is set to either one of the wide band and the narrow band in step S223 or S225. The other steps of the process are similar to those corresponding steps in FIG. 5, as described, mentioned above.

As will be readily understood from the above description, according to the method of the present invention, when the offset value of the oscillator calculated during the position measurement exceeds the predetermined reference value, the calculated time is backed up in the memory. When a predetermined reference time has not elapsed from the backup calculation time at the time point of the turn-on of the power source at the next position measurement, the initial search bandwidth at the start of the position measurement is set to a wide band. Even in case of using an oscillator of a low accuracy, therefore, the initial search bandwidth can be set to a narrow width in a situation such that the oscillator is continuously used in the ordinary temperature range. As compared with the conventional case of always setting the search bandwidth to a wide band, the time of capturing the satellite can be reduced. Even under the extreme temperature environment, the initial search bandwidth can be properly set and the capturing time can be reduced.

A search bandwidth setting method according to a third feature of the present invention will now be described hereinafter.

As will be readily understood from FIG. 1, (the absolute value of) the offset value has a large value only in both edge portions (near $+85°$ C. and $-40°$ C.) of the operation temperature range.

The receiver is seldom set to such a high or low temperature in ordinary use. It is considered that the occurrence of such a situation is concentrated to special cases in terms of the season and district. That is, in locations and times at which such a state does not occur generally, it can be regarded that such a situation never occurs. On the other hand, when such a situation occurs once, it can be presumed that such a state continues for a while.

According to the third feature of the present invention, in the case where it is necessary to search a wide band, as when using on oscillator of a low accuracy, the search operation is not of the type to always search the whole range of the temperature change of the offset value, as in the conventional method. When the backup offset value exceeds a preset reference value, the setting state of the initial search bandwidth is changed depending on whether the offset value has exceeded the reference value in the positive direction or in the negative direction. By using such a setting method, even using an oscillator of low accuracy, the initial search bandwidth can be set to a width as narrow as possible and the capturing time of the satellite can be reduced in correspondence to such a narrow bandwidth.

An embodiment of the method according to the third feature of the present invention will now be described hereinafter with reference to the drawings.

Figure 8:
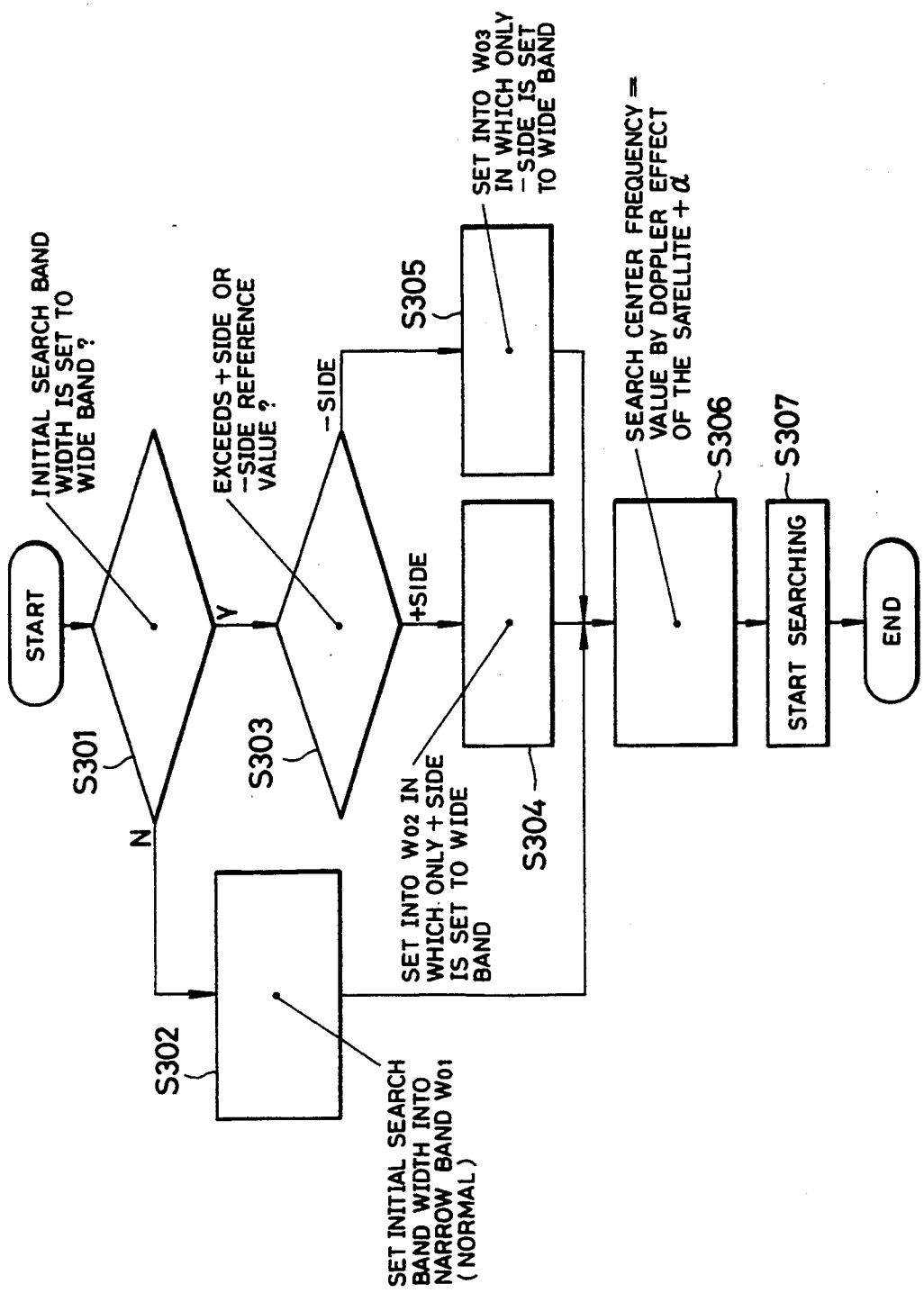
FIG. 8 is an operation flowchart according to further another embodiment of a method of the invention.
Figure 9:
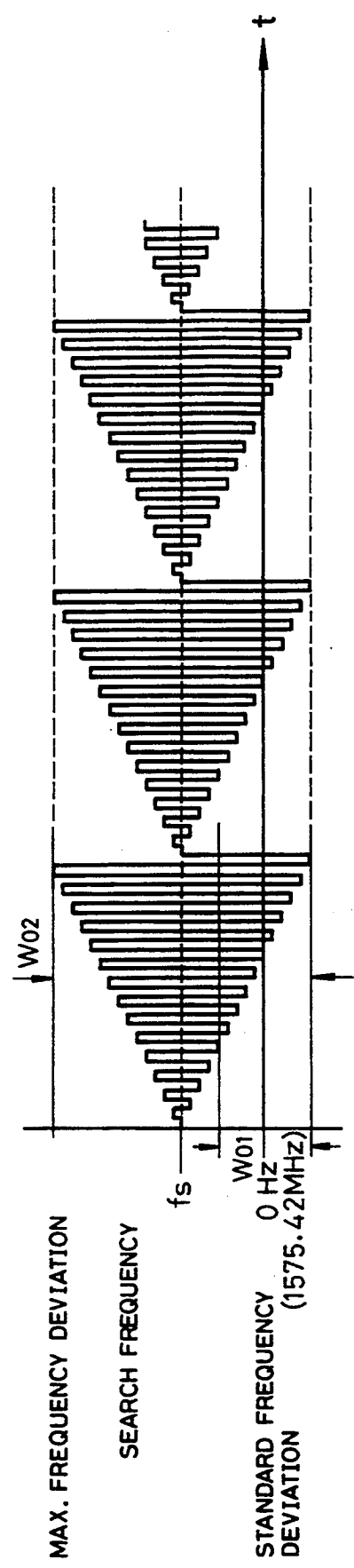
FIG. 9 is a diagram for explaining the switching operation of a search bandwidth in case of uniformly searching the frequencies in an initial search bandwidth in the embodiment.
Figure 10:
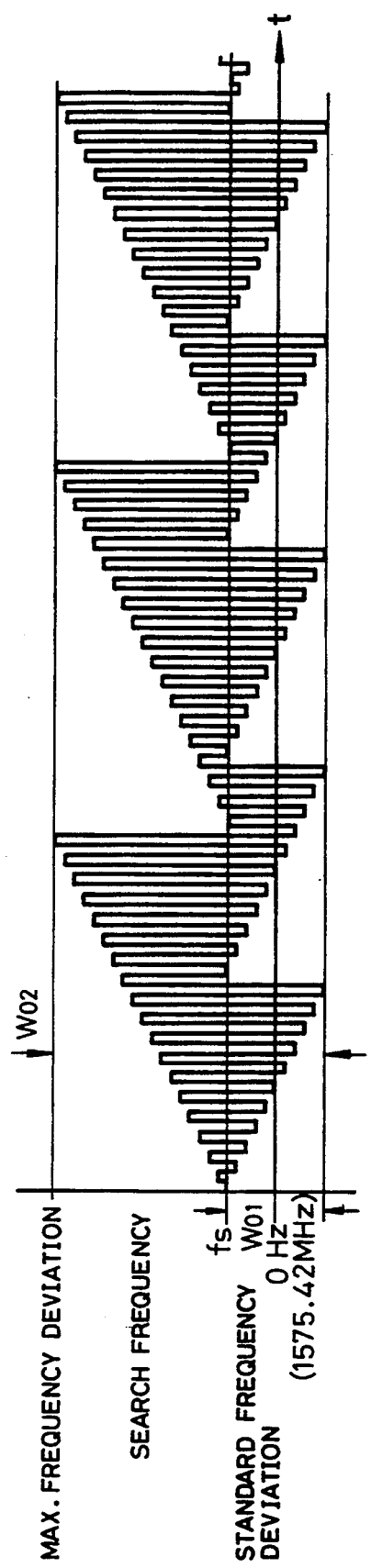
FIG. 10 is a diagram for explaining the switching operation of a search bandwidth in case of mostly searching an ordinary use temperature range in the initial search bandwidth in the embodiment.

FIG. 8 is an operation flowchart of an embodiment of the method of the present invention. FIGS. 9 and 10 are diagrams for explaining the switching operation of the search bandwidth in the embodiment.

In the case of the present invention, a positive side reference value and a negative side reference value to judge the magnitude of the offset value backed up in the memory are preset. For example, the operation in the case of temperature characteristics of FIG. 11 will now be explained. The offset value lies within a range of $\pm 5$ ppm in a range from $-20°$ C., to $+70°$ C., which is considered to almost cover the ordinary use temperature range. Therefore, $+5$ ppm is used as a positive side reference value and $-5$ ppm is used as a negative side reference value.

When the power source of the GPS receiver is turned on to execute the position measurement, the receiver discriminates whether the offset value (hereinafter, abbreviated to a backup value) $\Delta f_{osc}$ of the oscillator which has been backed up in the memory at the end of the preceding position measurement lies within a range of the reference values $\pm 5$ ppm or not (step S301 in FIG. 8).

When the backup value $\Delta f_{osc}$ lies within the range of the reference values $\pm 5$ ppm, the oscillator lies within the ordinary use temperature range ($-20°$ C. to $+70°$ C.) and it is presumed that the change in offset value is not so large. The initial search bandwidth, therefore, can be set to a narrow band. In this case, therefore, the processing routine advances to step S302 and the initial search bandwidth is set to $W_{01}$ in FIG. 11 (step S302).

On the other hand, when the backup value $\Delta f_{osc}$ is out of the range of $\pm 5$ ppm, the oscillator is out of the ordinary use temperature range ($-20°$ C. to $+70°$ C.) and it is presumed that the change is offset value is large, so that the initial search bandwidth cannot help being set to a wide band. In this case, consequently, the processing routine advances to step S303 and a check is made to see whether the read-out backup value $\Delta f_{osc}$ exceeds the positive side reference value ($+5$ ppm) or the negative side reference value ($-5$ ppm).

When it is detected that the backup value exceeds the positive side reference value ($+5$ ppm), the processing routine advances to step S304 and the initial search bandwidth is set to $W_{02}$ in FIG. 11. When it is detected that the backup value exceeds the negative side reference value ($-5$ ppm), the processing routine advances to step S305 and the initial search bandwidth is set to $W_{03}$ in FIG. 11.

After one of the initial search bandwidths $W_{01}$, $W_{02}$, and $W_{03}$ is set in accordance with the backup value $\Delta f_{osc}$ at that time as mentioned above, the search center frequency $f_s$ is set by using the Doppler frequency deviation $\Delta f_d$ of the satellite calculated from the orbit data and the desired offset value $\alpha$ in step S306. after that, the searching operation is started (step S307), as further shown in FIG. 9 or 10.

Each of FIGS. 9 and 10 shows an example of the switching operation of the search bandwidth where the backup value $\Delta f_{osc}$ exceeds the positive side reference value ($+5$ ppm). FIG. 9 shows the case where the search center frequency $f_s$ is set to the center of the initial search bandwidth $W_{02}$ and the inside of the search band $W_{02}$ is equivalently searched only the same number of times in the upper and lower sides. FIG. 10 shows the case where search center frequency $f_s$ is set to the upper edge position of the search bandwidth $W_{01}$ in the ordinary use temperature range and the inside of the search band width $W_{01}$, as an ordinary use temperature range is searched more times.

When the backup value $\Delta f_{osc}$ exceeds the positive side reference value (+5 ppm) as in the above example, it is considered that the present frequency of the oscillator is largely offset to the positive side. In case of the invention, as shown in FIGS. 9 and 10, with respect to the positive side which is considered to be offset, the satellite is searched up to the maximum fluctuation range (maximum frequency deviation) of the offset value. On the other hand, with regard to the negative side which is considered not to be offset, the satellite is not searched up to the maximum fluctuation range. It is, therefore, sufficient to set the search range on the negative side to a narrow value. The capturing time of the satellite is reduced in correspondence to such a narrow range.

In the case where the satellite signal cannot be captured even by repeating the searching operation a predetermined number of times (three times in FIG. 9, two times in FIG. 10) or only for a predetermined time within the initial search bandwidths $W_{01}$, $W_{02}$, and $W_{03}$, it is considered that the satellite doesn't exist in such a frequency range. After that, therefore, it is necessary to repeat the searching operation while widening the search range to the whole range of the offset value change of the oscillator, in a manner similar to the conventional method.

The value calculated last can be also used as a backup value $\Delta f_{osc}$. when the offset value exceeding the reference value is calculated, the backup value can be also updated. It is also possible to set a term of validity to the backup value and not to use the value beyond such a term.

As will be understood from the above description, according to the method of the invention, when the initial search bandwidth is set at the start of the next position measurement, in the case where the backup value exceeds the positive side reference value, the upper search band of the reference received frequency is set to the maximum range of the offset change of the oscillator and the lower search band is set to a band smaller than the maximum range of the offset change. When the backup value exceeds the negative side reference value, the lower search band of the reference received frequency is set to the maximum range of the offset change of the oscillator and the upper search band is set to a band smaller than the maximum range of the offset change. Even when using an oscillator of a low accuracy or the like, therefore, when an error of the offset value is so large that the search band must be set to the whole range of the offset change of the oscillator, the initial search bandwidth can be set to a width as narrow as possible. The capturing time of the satellite can be reduced in correspondence to setting such a narrow bandwidth.

What is claimed is:

1. A method of setting a search band in a GPS receiver, the method comprising the steps of:
    a) reading from a memory a stored oscillator offset value, and determining if said stored oscillator offset value is within a predetermined reference range;
    b) if said stored offset value is within said predetermined reference range, setting said search band around a center frequency determined by a doppler effect of said GPS satellite and said stored oscillator offset value and searching over a first range of frequencies; and
    c) if said stored offset value is outside said predetermined reference range, setting said search band around a center frequency determined by said doppler effect of said GPS receiver and said stored oscillator offset value and searching over a second frequency range, said second frequency range being wider than said first range of frequencies.

2. The method recited in claim 1, further comprising the steps of:
    prior to performing steps (a), (b) and (c), determining if said stored oscillator offset value is to be used as a backup value; and
    if said stored oscillator offset value is not to be used as a backup value, skipping steps (a), (b) and (c) and setting said search band around a center frequency determined by said doppler effect of a GPS satellite and a desired offset and searching over a third predetermined range of frequencies.

3. The method recited in claim 2, wherein said third predetermined range of frequencies encompasses substantially an entire range of frequency offsets of an oscillator.

4. The method recited in claim 1, wherein said stored oscillator offset value is an offset value of said oscillator last measured before completion of a preceding GPS satellite position measurement.

5. A method of setting a search band in a GPS receiver, the method comprising the steps of:
    reading from a memory in said receiver a stored oscillator offset value and determining if said stored oscillator offset value is to be used as a backup value;
    if said stored oscillator offset value is not to be used as a backup value, setting said search band around a center frequency determined by a doppler effect of a GPS satellite and a desired offset and searching over a first predetermined range of frequencies;
    if said stored oscillator offset value is to be used as a backup value, further determining if said stored offset value is within a predetermined reference range;
    if said stored offset value is within said predetermined reference range, setting said search band around a center frequency determined by said doppler effect of said GPS satellite and said backup value and searching over a second range of frequencies; and
    if said stored offset value is outside said predetermined reference range, setting said search band around a center frequency determined by said doppler effect of said GPS receiver and said backup value and searching over a third frequency range, said third frequency range being wider than said second frequency range.

6. The method recited in claim 5, wherein said stored offset value is an offset value of said oscillator last measured before completion of a preceding GPS satellite position measurement.

7. The method recited in claim 5, wherein said first predetermined range of frequencies comprises substantially an entire range of frequency offsets of an oscillator.

8. A method of setting a search band in a GPS receiver, the method comprising the steps of:

a) if an offset value of an oscillator in said receiver measured at a first time exceeds a reference value, determining if a time period between a present time and said first time exceeds a reference time;
b) if said time period exceeds said reference time, setting a search bandwidth of said receiver to a first bandwidth; and
c) if said time period does not exceed said reference time, setting said search bandwidth to a second bandwidth, said second bandwidth being narrower than said first bandwidth.

9. The method recited in claim 8, further comprising setting a center frequency of said search bandwidth to a sum of a value determined by a value of a doppler effect of said satellite and a predetermined fixed offset value.

10. The method recited in claim 8, wherein a flag is set during a satellite position measurement, said flag indicating that said offset value of said oscillator exceeds said reference value and a time of setting said flag is stored as said first time.

11. The method recited in claim 10, wherein said flag is tested to determine if said offset value of said oscillator exceeds said reference value and is reset at said present time if said second bandwidth is set.

12. The method recited in claim 8, wherein if said offset value of said oscillator in said receiver does not exceed said reference value, said search bandwidth is set to said second bandwidth.

13. The method recited in claim 8, further comprising the steps of
d) reading from a memory in said receiver a stored oscillator offset value; and
e) if said stored offset value is to be used as a backup value setting said search bandwidth to a first predetermined width and a search center frequency to a value determined by a doppler effect of a said satellite and said backup value.

14. The method recited in claim 13, wherein step (e) is performed before step (a) and if step (e) is executed, steps (a), (b), and (c) are not executed.

15. The method recited in claim 13 wherein steps (d) and (e) are executed after steps (a), (b) and (c) are completed.

16. The method recited in claim 11, wherein said receiver continually executes position measurements until said receiver captures a GPS satellite, each subsequent one of said position measurements having a wider bandwidth than a bandwidth set for a previous position measurement.

17. A method of setting a search bandwidth in a GPS receiver, the method comprising the steps of:
reading from a memory in said receiver a stored oscillator offset value as a backup value;
if said backup value exceeds a reference offset value by a predetermined amount in a first direction, setting said search bandwidth around a center frequency to have a first search range of frequencies in said first direction and a second range of search frequencies in a direction opposite said first direction, said first range being broader than said second range.

18. The method recited in claim 17, wherein said first direction is a positive direction, said search bandwidth encompassing said first range of frequencies above said center frequency and said second range of frequencies below said center frequency.

19. The method recited in claim 17, wherein said first direction is a negative direction, said search bandwidth encompassing said first range of frequencies below said center frequency and said second range of frequencies above said center frequency.

20. The method recited in claim 17, wherein said center frequency is set by summing a frequency corresponding to a doppler effect of said satellite and a predetermined offset.

21. The method recited in claim 17, wherein if said backup value does not exceed said reference offset value, said search bandwidth is set to a frequency range narrower than said first search frequency range.

* * * * *